United States Patent [19]

Stephenson

[11] Patent Number: 5,541,686
[45] Date of Patent: Jul. 30, 1996

[54] CAMERA ADAPTER

[76] Inventor: Stanley W. Stephenson, Eastman Kodak Company, Rochester, N.Y. 14650

[21] Appl. No.: 234,217

[22] Filed: Apr. 28, 1994

[51] Int. Cl.⁶ .................................................. G03B 15/03
[52] U.S. Cl. ................ 354/141; 354/149.1; 354/127.13; 354/295
[58] Field of Search ................................ 354/149.1, 141, 354/127.13, 295, 296

[56] References Cited

U.S. PATENT DOCUMENTS

| | | |
|---|---|---|
| 2,641,952 | 6/1953 | Mellert . |
| 3,687,030 | 8/1972 | Dine et al. ................................. 95/11 |
| 3,747,490 | 7/1973 | Brandt ......................................... 95/11 |
| 3,836,927 | 9/1974 | Dine et al. ................................ 354/80 |
| 4,219,264 | 8/1980 | Rodeck . |
| 4,515,453 | 5/1985 | Wakabayashi et al. . |
| 4,755,838 | 7/1988 | Lemmey ................................... 354/80 |
| 5,146,256 | 9/1992 | Frosig et al. . |
| 5,305,037 | 4/1994 | Noguchi et al. . |

*Primary Examiner*—Monroe H. Hayes

[57] ABSTRACT

An optical adapter having at least one optical element which is attachable to a camera having a taking lens. The adapter is movable to selectively move the optical element(s) over or away from the taking lens after the adapter has been attached to the camera. According to the invention, the adapter can include a diffuser which covers a flash unit of the camera while the optical element covers the taking lens. Preferably, the adapter is entirely made from a single material.

8 Claims, 5 Drawing Sheets

CAMERA ADAPTER

FIELD OF THE INVENTION

This invention relates to the field of photography and particularly to an adaptive attachment for a camera to allow the camera to assume more than one picture-taking mode.

BACKGROUND OF THE INVENTION

Conventional cameras are typically provided with a camera body having a taking lens which is fitted to the camera body, a viewfinder for determining the field of view of a photographic scene and an electronic flash unit integral to the camera body or else directly attached thereto which provides adequate illumination to allow a subject to be photographed. Typically, inexpensive cameras are provided with picture taking lenses having a fixed focal length whereby correctly exposed, that is relatively blur-free photographs, can be taken from a range of distances of between approximately five feet to infinity. This range is considered adequate for a statistically high percentage of photographs.

However, these inexpensive cameras, such as conventional 35 mm NSLR cameras manufactured by the Eastman Kodak Company, among others, do not produce properly exposed pictures when close-up pictures are taken (that is, where the subject to camera distances are less than five feet). The resulting prints can on occasion be out of focus due to the capability of the optics used. In addition, the quality of close-up photographs can also be effected by the electronic flash unit conventionally used by these cameras which provide adequate illumination at distances in the range of about 5 to 14 feet (1.5 to 4.3 meters), but produce excessive amounts of flash output when photographs are obtained at closer distances.

To allow close-up pictures to be taken lens elements having a shorter focal length could be added to the camera, but this reduces the ability of the camera to take properly focused pictures for subjects at distances greater than 10 feet (3 meters). In addition, the flash unit may still produce excessive illumination for close-up photography.

U.S. Pat. No. 3,836,927 describes a camera attachment having a mounted assembly, including a close-up diopter lens, which mounts to the front of a camera taking lens to allow close-up photographs to be taken. The assembly also includes a sliding member which can reduce the size of the flash aperture to thereby decrease illumination on a subject. The described attachment, however, must be separately removed in order for the camera to be reverted into a "normal" (not close-up) picture taking mode. This requires additional steps for the photographer which are not always convenient, requiring independent movements or removal of each component of the mounted assembly to alter the mode of the camera to allow for either close-up or normal picture taking. In addition, this assembly is not suited to other picture taking modes, such as tele-photo, or those using wide angle lenses and the like.

There is a need to provide a camera attachment which can be conveniently attached to the camera whereby the camera can be placed into separate picture taking modes without having to remove the attachment or otherwise interfere with the taking of photographs.

SUMMARY OF THE INVENTION

The present invention is directed to overcoming one or more of the problems set forth above. Briefly summarized, according to one aspect of the present invention, there is provided an optical adapter comprising an optical element and means for attaching the adapter to a camera having a taking lens, characterized in that:

the adapter has means for moving the optical element selectively over and away from the taking lens of the camera after the adapter is attached to the camera.

According to another aspect of the present invention there is provided for a camera having a taking lens fitted to a body, an optical adapter having an optical element, and means for attaching the adapter to the camera body, characterized by:

means for moving the optical element selectively over and away from the taking lens of the camera after the adapter has been attached to the camera.

In a preferred arrangement, the adapter includes means for varying the illumination of a flash unit of the camera after the adapter has been attached thereto in order to cover the flash unit when the optical element has been moved over the taking lens.

Preferably, the optical element and the flash varying means are integral to the adapter and the adapter can be manufactured from a single plastic or other lightweight material.

An advantage of the present invention is that the adapter can be easily engaged with the body of a camera and can remain attached to the camera, even while the camera is being used for normal picture taking.

A further advantage of the present invention is that the adapter is provided with a series of integral components which are easily attachable to the camera body and easily removable therefrom.

A still further advantage according to the present invention is that the entire adaptive attachment, including the specified integral components, can be manufactured from a single material. This directly improves the time of manufacture and the cost of the apparatus in relation to a camera. Furthermore, the adapter can be included as part of the camera as purchased, without significantly increasing either the size of the container or the cost of the camera.

These and other aspects, objects, features and advantages of the present invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
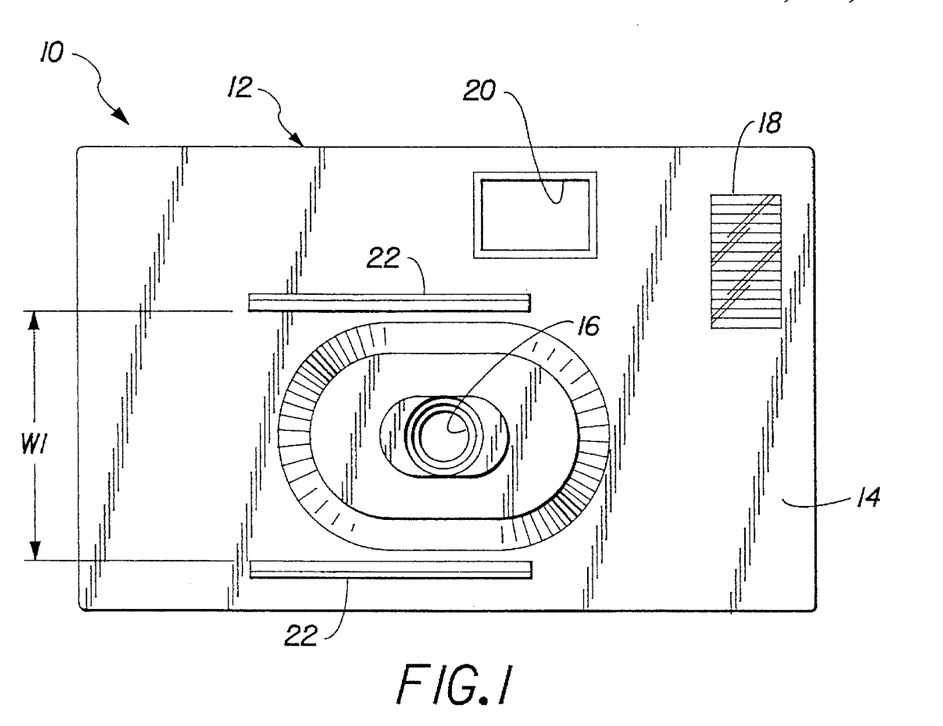
FIG. 1 is a front perspective view of a camera adapted for receiving an adapter plate according to a first embodiment of the present invention.

Referring to the drawings in detail and specifically to FIG. 1, there is provided a typical low cost camera 10, such as a Kodak Funsaver single use camera, having a body 12 consisting of a defined front facing surface 14, a picture taking lens 16 fitted to the body, a viewfinder for defining a field of view and having a window 20, and an optionally provided electronic flash unit 18 integral to the body and fitted within a defined recess (not shown). All of the above elements are typically found in conventional still photographic cameras. Their operation is conventional and well known in the photographic art and require little further discussion as related to the present invention, except as described herein.

A pair of rail-like support members 22 are provided along the front facing surface 14 of the camera 10 which are disposed to either side of; that is, above and below the fitted taking lens 16, as shown in FIG. 1. Additional features regarding these support members 22, including their function, will be described in greater detail below.

Figure 2:
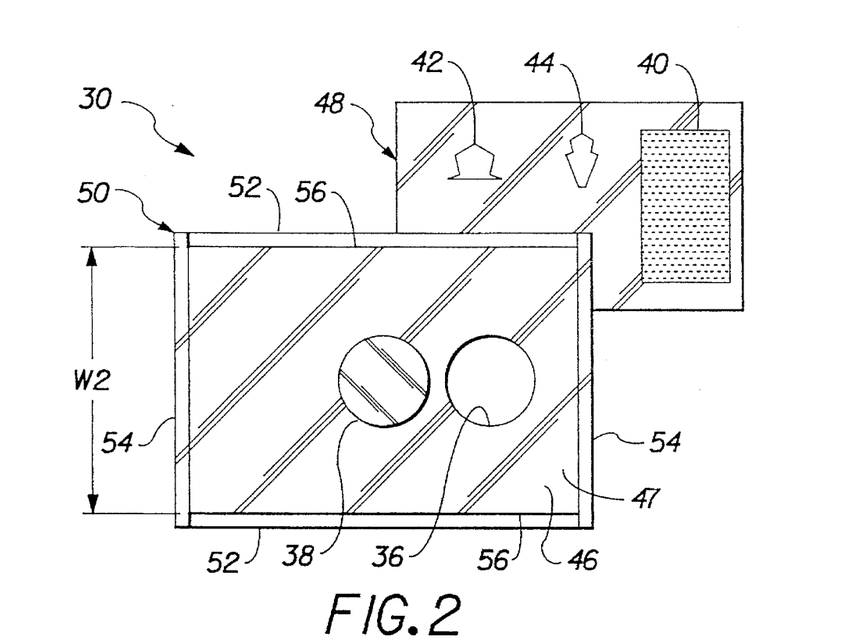
FIG. 2 is a front perspective view of an adapter plate which can be attached to the camera shown in FIG. 1.

Referring now to FIG. 2, there is shown an adapter 30, which is preferably a unitary planar member or plate which is manufactured from a single clear or transparent plastic material, such as PMMA, or other acrylic resins from which optical elements can be manufactured. The adapter 30 includes a defined circular opening 36 which is configured to be at least as large as the field of view of the picture taking lens 16, FIG. 1, a close-up diopter lens 38 adjacent the circular opening, a flash diffuser 40, and a pair of viewfinder indices 42, 44. All of the above constituent components, including the close-up diopter lens 38, are preferably integral to the adapter 30. It is well known in the field that plastic optical elements can be readily manufactured and therefore allow the entire plate to be made from a single mold.

The flash diffuser 40 is preferably a substantially rectangular shaped frosted or translucent portion defined on the adapter 30 which is sized to fit over the electronic flash unit 18, FIG. 1, when the adapter is attached to the camera body 12, FIG. 1, in a manner as described below. The frosted region can be provided by forming a textured surface over that portion of the adapter 30. It has been found that effecting the flash output by providing a filter-like element sized to fit over the entire flash unit 18, FIG. 1, provides softer and more uniformly dispersed illumination than is accomplished by merely shrinking the size of the flash aperture, such as by covering a portion thereof. The uniformness of the flash illumination, in turn, has been found to improve the exposure quality of close-up photographs whereas current inexpensive cameras, which merely shrink the flash aperture, tend to have a significant fall-off in light intensity between the center and the edges of the picture. The diffusion area provided by the frosted plastic portion 40 of the adapter 30 provides more uniform light across the scene to be photographed in the close-up mode.

The adapter 30 is further provided with a set of indices 42, 44 that are spaced from one another and configured to move past the viewfinder window 20 when the adapter is attached to the camera 10. Preferably, the writing thickness of the indices 42, 44 allows them to be visible as the eye of the user approaches the viewfinder window 20, but makes them become virtually unnoticeable as the eye is brought to a nominal position for scene framing with respect to the viewfinder. Providing an average thickness of about 0.002–0.008 inches (0.05–0.20 mm) produces the desired effect. A linear motion of the adapter 30, as described below, causes one index 42 to slide out of the viewfinder window 20, as the other index 44 is moved into the window, the indices being configured so as to indicate to the user the particular picture taking mode of the camera 10. As is apparent, any convenient set of indices can be used; for example, it may not be necessary to provide a symbol 42 to define a normal picture taking mode.

Figure 3:
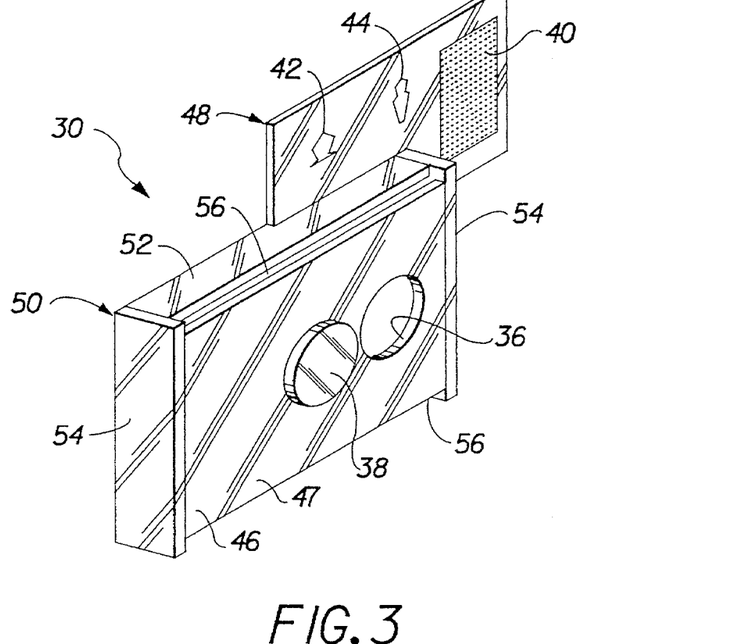
FIG. 3 is an front isometric view of the adapter plate shown in FIG. 2.

Referring to FIG. 3, additional detail relating to the structure of the adapter 30 will now be described. The adapter 30 comprises a top portion 46, a bottom portion 48, and an attachment portion 50. Each of these portions are interconnected to form a unitary planar structure.

The top portion 46 consists of a facing surface 47 upon which are found the close-up diopter lens 38 and the circular opening 36 which extends theretrough.

The bottom portion 48 defines that portion of the adapter 30 having the flash diffuser 40 which is found at one end thereof, as shown in FIG. 2, and the clear portion onto which the viewfinder indices 42, 44 are affixed.

The top portion 46 of the adapter 30, is preferably recessed from the bottom portion 48 due to the presence of the camera taking lens 16. By aligning these portions 46, 48 as described, the flash diffuser 40 and the viewfinder indices 42, 44 can be placed flush against the front facing surface 14 when the adapter 30 is attached. The taking lens 16, on the other hand, being fitted to the camera body 12, FIG. 1, extends outward of the front facing surface 14; therefore, top portion 46 is recessed by a corresponding amount to accommodate for this geometry.

Figure 4:
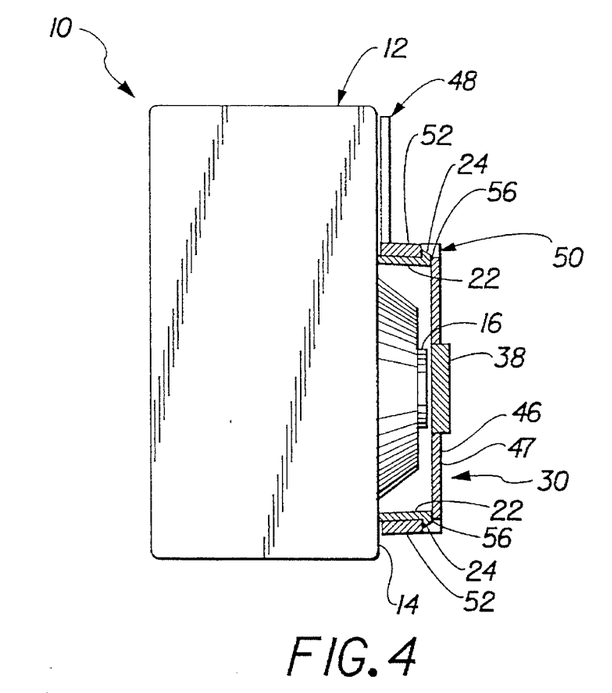
FIG. 4 is a side elevational view taken partially in section of the attachment of the adapter shown in FIGS. 2 and 3 to the camera of FIG. 1.

As noted above, and turning briefly to FIG. 4, a pair of support members 22 extend outwardly from the camera front facing surface 14. Each of the support members 22 are defined by a tapered hooking portion or tab 24, as well as a supporting surface 25. Each of the support members 22 are disposed a known distance to either side, that is, above and below the taking lens 16 respectively totalling a distance W between the two members as shown in FIG. 1. In addition, the support members 22 extend sufficiently outward from the front facing surface 14 so that the hooking portions 24 are substantially flush with the fitted taking lens 16.

Returning to the description of the adapter 30 and particularly to FIG. 3, the attachment portion 50 is preferably defined by an open ended rectangular frame like structure defined by two opposing pairs of sidewalls 52, 54 which form a rectangular periphery. The first pair of sidewalls 52 are separated from the top portion 46 of the adapter 30 by a pair of slots 56 which provide clearance for the hooking portions 24 when the adapter 30 is assembled with the camera 10.

The remaining pair of sidewalls 54 combine with the top portion 46 and the first pair of sidewalls 52 to form an open-ended box like structure. The distance between the first pair of sidewalls FIG. 2, is preferably slightly smaller than the distance W1, FIG. 1, between the support members 22. Because, however, the adapter 30 is made from a plastic material the sidewalls 52 can be made to deform elastically to allow the adapter 30 to be mounted to the camera 10 as described below.

In operation, and referring to FIGS. 3–6, the adapter 30 is attached to the camera front facing surface 14, FIG. 1, by fitting the attachment portion 50, and in particular, each of the sidewalls 52, over the hooked portions 24 of support members 22. See FIG. 4 which more clearly illustrates the attachment detail between the adapter 30 and the camera 10. As noted in the preceding paragraph, the distance between the support members 22 (W1) FIG. 1 is slightly greater than the distance between the first pair of sidewalls 52 (W2). FIG. 2 The application of an inwardly directed force against each of the second pair of sidewalls 54, however, allows the the interconnected sidewall pair 52 to elastically deform in an outward direction relative to the box-like frame structure. In this embodiment, the first sidewall pair 52 act as flexures to deflect a sufficient distance to allow the hooking portions 24 to clear the sidewalls and engage the slots 56 when the adapter 30 is fitted. The hooking portions 24 are sized to fit into each of the slots 56. The sidewalls 52 each elastically return to substantially their original dimension and rest on corresponding supporting surfaces 25 after the inwardly directed pressure force is removed. Because the distance between the members 22 (W1) is larger than the original distance between the sidewall pair 52 (W2), the adapter 30 biasedly engages the front facing surface 14 of the camera and specifically the supporting surfaces 25.

Alternatively, the adapter 30 can be snapped onto the support members 22 without application of inward finger pressure by placing the sidewalls 52 adjacent the support members and pushing the adapter directly onto the camera body 12.

Though the adapter 30 is fixedly attached to the camera 10, it is still free to slide, across surface 14 allowing the camera 10 to be placed into separate picture taking modes as described in greater detail below. The length of slide travel for the adapter 30 along the front of the camera 10 is governed by the size of the top portion 46 of the adapter, and in particular to the length of the slots 56, which are preferably made longer than the length of the support members 22. This difference in length should be sufficient to allow the integral elements located on the adapter 30 to be brought into and out of engagement with the corresponding photographic elements of the camera 10. The length of travel of the adapter 30 is bounded by the second pair of sidewalls 54 which provide stops for the movement of the adapter in either linear direction across the front of the camera 10.

The adapter 30 according to this embodiment is easily removable from the camera body 12. To remove the adapter 30, the sidewalls 54 are squeezed with finger pressure to allow the attaching pair of sidewalls 52 to elastically deform outwardly. This deformation provides sufficient clearance for the sidewalls 52 to be pulled over the hooking portions 24 to disengage the adapter 30 from the camera body 14. A release of the pressure force restores the adapter 30 to its original size, allowing repeatable ease in attachment and removal.

Figure 5:
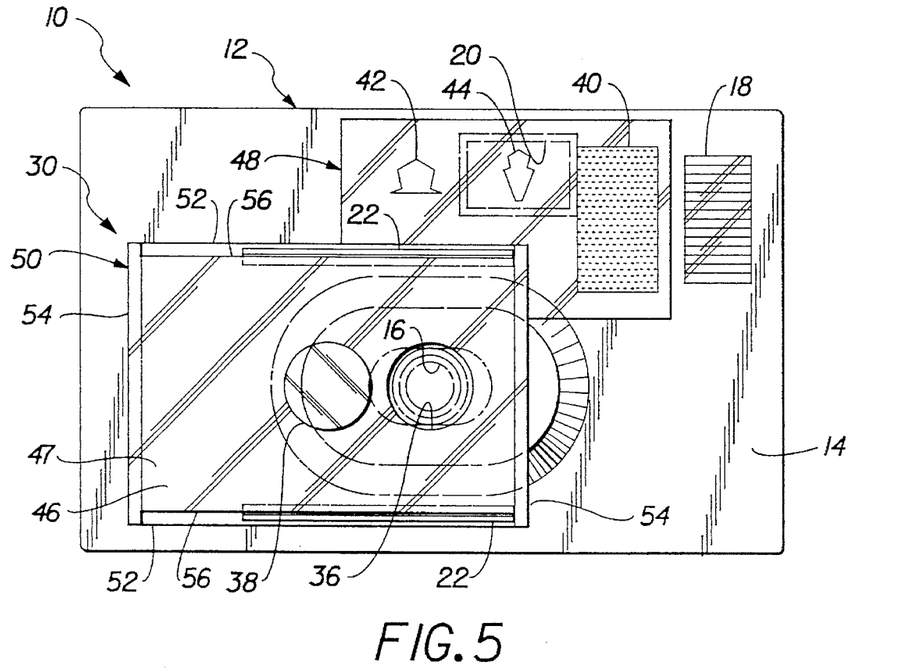
FIG. 5 is a front perspective view of the adapter plate shown in FIGS. 2 and 3 when mounted to the camera and illustrating a normal picture taking mode.
Figure 6:
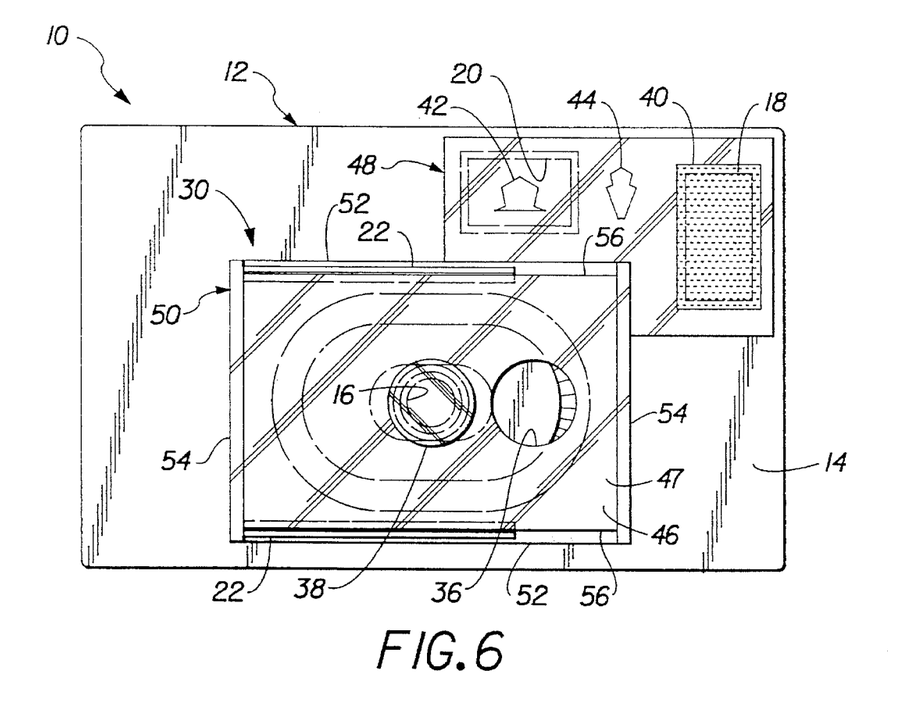
FIG. 6 is a front perspective view showing the camera and attached adapter plate of FIG. 5 in a close-up picture taking mode.

The operation of an adapter 30 after attachment to a camera 10 is herein described with reference to FIGS. 5 and 6. The camera 10 can be placed in either a normal or a close up picture taking mode by sliding the adapter 30 across surface 14.

In a normal mode, the adapter 30 is attached so that the taking lens 16 is optically aligned with the circular aperture 36. In this position, the flash diffuser 40 is not in engagement with the electronic flash 18 and the normal index 44 is visible in the viewfinder window 20. To place the camera in a close-up picture taking mode, FIG. 6, the user need only slide the adapter 30 along supporting surfaces 25 until the close-up diopter lens 38 is optically aligned with the taking lens 16. This movement also brings the flash diffuser 40 into engagement by covering the electronic flash unit 18 and moves index 42 into the viewfinder window 20. In a preferred arrangement, the user will know the camera 10 is correctly set into a picture taking mode by sizing the length of sliding travel of the adapter 30 so that alignment of each of the two modes occurs only at the end of travel in either direction.

To insure compliance, structure can be built into the adapter 30 and the rail like support members 22 in order to generate a centering force when the adapter is near either of the two focus positions. This could be done, for example, by providing a long arm-like element (not shown) formed on the attachment structure of the adapter 30. The arm is spring biased against either an opposing part in the form of a ramping or camming shapes disposed on either or both of the support members 24 or the adapter 30 to cause a force to be generated that centers the two members against one another. An arrangement such as described is particularly useful if the adapter 30 utilizes a plurality of optical adapters to achieve more than one picture taking mode.

Providing an optical adapter 30 as described for the camera 10 of this particular embodiment, produces the following improvements. The taking lens 16 is a 35 mm lens having an aperture of f/11 which provides a focus distance of about 6.5 feet (2 meters) in the normal picture taking mode. The addition of a 1.125 diopter lens 34 having a focal length of about 890 mm allows the combined taking system of the camera 10 to provide a focus distance of about 2.5 feet (0.8 meters). In addition, the focus range in the close up mode will be 1.4 to 9.5 feet (0.4 to 2.9 meters) as opposed to about 3.5 feet (1.1 meters)to infinity in the normal picture taking mode. Exposure distance in the close-up mode is about 1.32 to about 7.5 feet (0.4 to 2.3 meters) as opposed to about 3–10 feet (0.9–3 meters) in the normal picture taking mode. Therefore, by providing an adapter 30 as described, superior quality pictures can be taken when the subject to be photographed is in the 3–7 foot range, as well as in the typical picture taking range of about 5 feet to infinity. Note that the aperture used in this specific embodiment is relatively small; for those cameras having larger aperture sizes the effect is substantially more pronounced.

It should be readily apparent that the adapter 30 can provide for more than close-up and normal picture taking modes. For example, a telephoto or a wide-angle lens (not shown) can be substituted for the diopter lens 18, while other flash output varying means, such as a set of baffles (not shown) to direct the flash output through a more concentrated field of illumination, can be used in place of the diffuser 40.

In addition, the adapter need not be in the form of a sliding planar member. Referring now to FIGS. 7–10(b), a second embodiment of the present invention is herein described. Similar parts used in the previous embodiment are identified with the same reference numerals.

Figure 7:
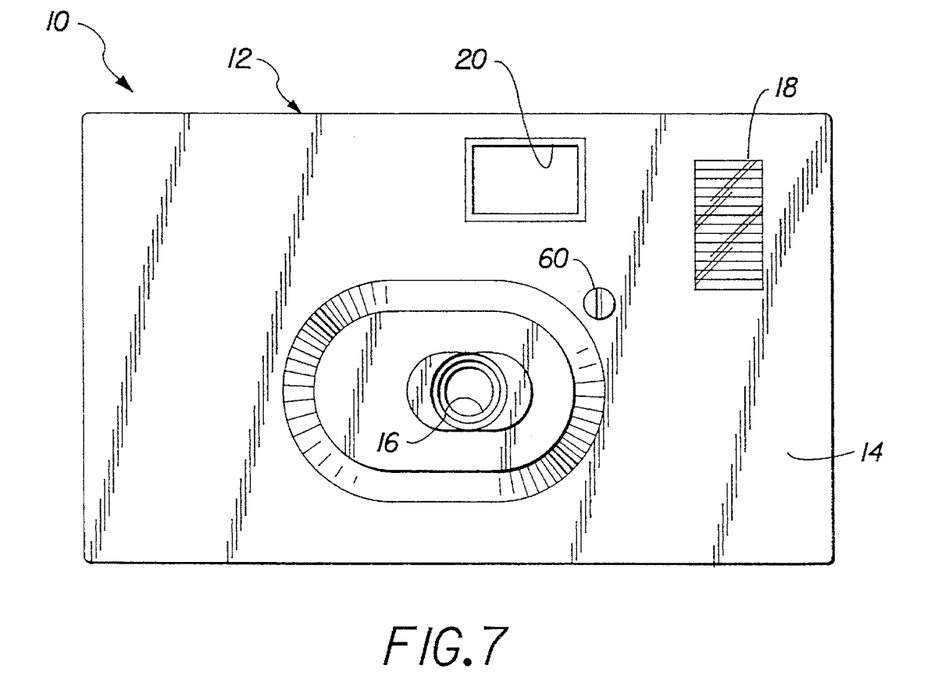
FIG. 7 is a front perspective view of a camera for receiving an adapter plate according to a second embodiment of the present invention.

In FIG. 7, a camera 10, such as the FUNSAVER single use camera manufactured by Eastman Kodak Company is provided having a plastic body 12, including a front facing surface 14, a picture taking lens 16 fitted to the front facing surface, a viewfinder 20 for defining a field of view for the taking lens, and an optional electronic flash unit 18.

In addition, and referring to FIGS. 7 and 9, there is provided an attachment member 60 consisting of a pair of adjacent semi-circular prong-like members 62, each having a ramped engagement surface 64 for receiving an adapter 70 as described below.

Figure 8:
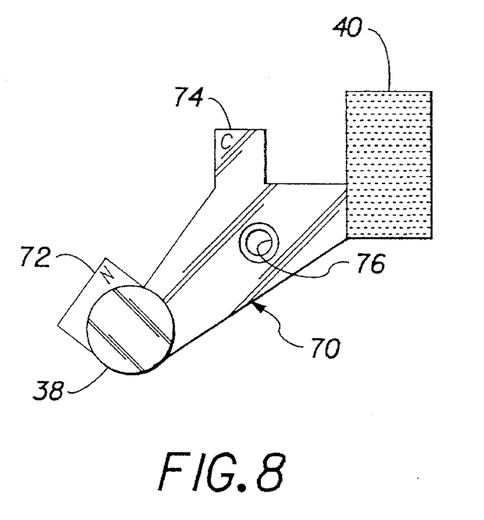
FIG. 8 is a front perspective view of the adapter plate to be attached to the camera shown in FIG. 7.

Referring to FIG. 8, the adapter 70 is preferably a single unitary member made from a lightweight plastic material having an integral optical element, such as close-up diopter lens 38 disposed on one side which is sized to fit over the taking lens 16. A flash diffuser 40 sized to fit over the electronic flash unit 18 is disposed on the other side of the adapter 70. The diffuser 40 is a frosted or textured portion which diffuses the entirety of the flash output from the flash unit 18 when engaged therewith.

A pair of indicator portions 72, 74 are disposed from the main body of the adapter 70 which are positioned to be visible in the viewfinder 20 depending on whether the adapter 70 places the camera 10 in either a normal or close-up picture taking mode.

A circular opening 76 is disposed in the adapter 70 having a diameter which is slightly less than the diameter of the attachment member 60 to provide a biased fit when the adapter 70 is engaged with the camera 10. Referring to FIG. 9, the opening 76 is inset a portion of the thickness of the adapter 70 and is further defined by an engagement surface 78, upon which the prong members 62, 64 rest after engagement.

Figure 9:
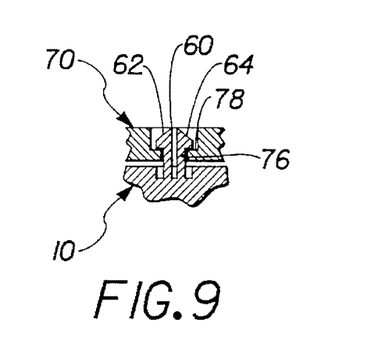
FIG. 9 is a partial cross sectional view illustrating the attachment of the adapter plate of FIG. 8 to the camera of FIG. 7.
Figure 10A:
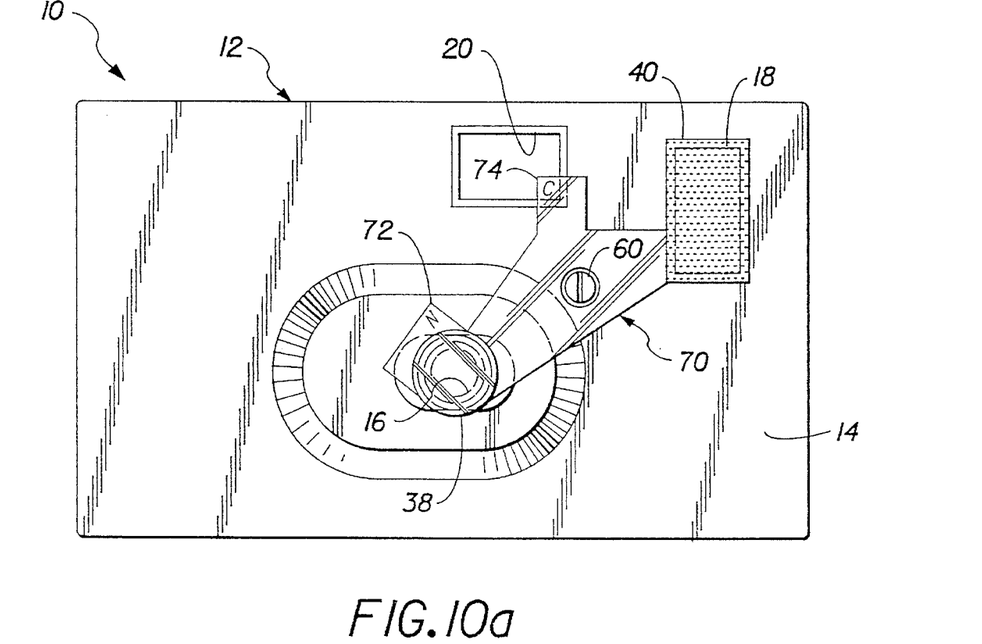
FIG. 10(a) is a front view of the camera of FIG. 7 having an attached adapter plate showing the camera in a close-up picture taking mode.
Figure 10B:
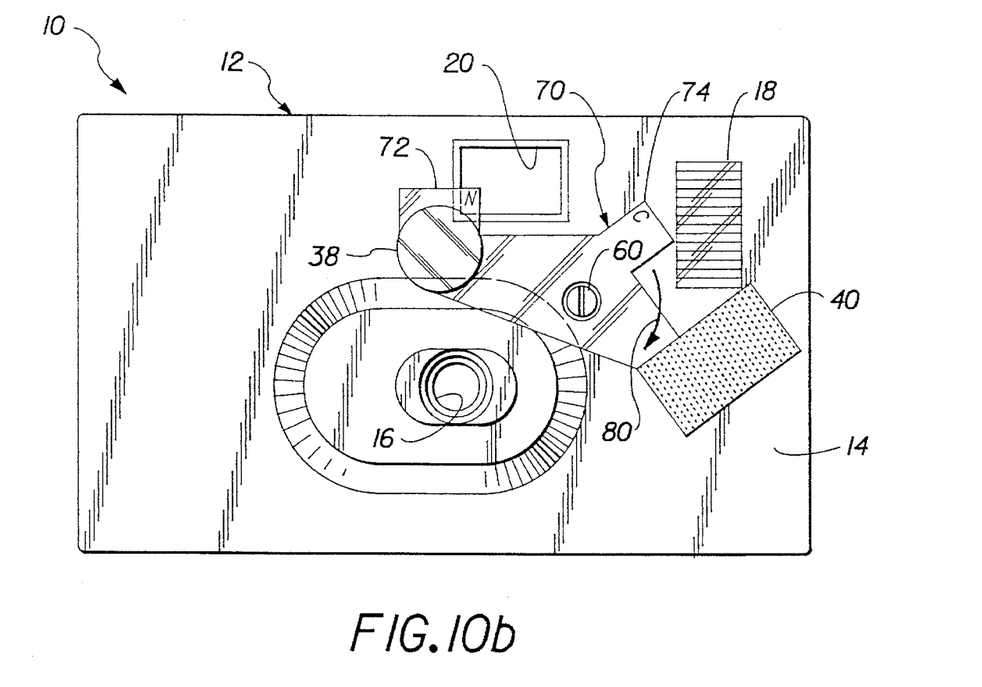
FIG. 10(b) is a front view of the camera of FIG. 7 having an attached adapter plate showing the camera in a normal picture taking mode.

In operation and referring to FIGS. 9, 10(a) and 10(b), the adapter 70 is assembled by pressing attachment member 60 through opening 76. The prong members 62, 64 being made from a compliant plastic material elastically deform and compress sufficiently to fit through the opening 76. Upon fitting through the inset portion of the opening 76, the prong members 62, 64 expand and are biased into position on engagement surfaces 78 to be retained onto the camera body 12. Despite the retention, however, the adapter 70 is free to rotate about this attachment to place the camera 10 in each of the modes shown in FIGS. 10(a) and 10(b).

FIG. 10(a) illustrates a close-up picture taking mode in which the diopter lens 38 effectively covers taking lens 16, the flash diffuser 40 covers the electronic flash unit 18 and indicator portion 74, having a stenciled or other optical denotation, is visible in the viewfinder 20.

FIG. 10(b) illustrates a normal picture taking mode which the camera 10 can assume while the adapter 70 is still attached to the camera body 12. By rotating the adapter 70 about the point of attachment as shown by arrow 80 each of the adapter elements, with the exception of indicator portion 72, are disengaged with the corresponding elements of the camera 10. Indicator portion 72 is visible in the viewfinder 20 to notify the user that the camera 10 is in a normal taking mode and that the adapter 70 is still attached to the camera.

It should be apparent that the described adapter can be included with any type of optical element such as a filter or other element which can be selectively placed over the taking lens of the camera.

While the invention has been described with particular reference to the above preferred embodiments, it will be understood by those skilled in the art that various changes may be made and equivalents may be substituted for elements of the preferred embodiment without departing from the spirit and scope of the present invention.

| Parts List for FIGS. 1–10(b) | |
|---|---|
| 10 | camera |
| 12 | body |
| 14 | front facing surface |
| 16 | taking lens |
| 18 | flash unit |
| 20 | viewfinder |
| 22 | support members |
| 24 | hooking portion or tab |
| 25 | supporting surface |
| 30 | adapter plate |
| 36 | circular opening |
| 38 | diopter lens |
| 40 | flash diffuser |
| 42 | index |
| 44 | index |
| 46 | top portion |
| 47 | facing surface |
| 48 | bottom portion |
| 50 | attachment portion |
| 52 | pair of sidewalls |
| 54 | second pair of sidewalls |
| 56 | slots |
| 60 | attachment member |
| 62 | prong member |
| 64 | prong member |
| 70 | adapter |
| 72 | indicator portion |
| 74 | indicator portion |
| 76 | circular opening |
| 78 | engagement surface |
| 80 | arrow |

What is claimed is:

1. An optical adapter for providing separate photographic modes in a camera having a frame, said adapter comprising an optical element for covering a taking lens of said camera, means for varying the flash illumination output of a flash unit of said camera, and means for releasably attaching said adapter to said camera, said releasable attachment means includes means for selectively moving said adapter so as to cover said taking lens and said flash unit to provide at least two photographic modes for said camera after said adapter has been attached to said frame.

2. An adapter according to claim 1, wherein said releasable attachment means includes an engagement aperture for engaging a pin member of said frame for allowing said adapter to rotatably move said optical element and said flash illumination varying means relative to said taking lens and said flash unit.

3. An adapter according to claim 1, wherein said releasable attachment means includes a pair of engagement surfaces having a spacing which is less than a pair of corresponding supporting surfaces disposed on said frame.

4. An adapter according to claim 3, wherein said engagement surfaces can be moved relative to said supporting surfaces to allow said adapter to slide into separate photographic modes when said adapter is attached to said frame.

5. An adapter according to claim 1, including indicator means for covering a portion of a viewfinder of the camera.

6. An adapter according to claim 5, wherein said optical element, said flash illumination varying means and said indicator means are integral to said adapter, and in which said adapter is made from a single material.

7. An adapter according to claim 6, wherein said adapter is transparent.

8. An adapter according to claim 7, wherein said indicator means includes a pair of indices on a portion of said transparent surface, said indices having a visibly imperceptible thickness for allowing the indices to be invisible until a viewer's eye is brought to the viewfinder for viewing.

\* \* \* \* \*

UNITED STATES PATENT AND TRADEMARK OFFICE
CERTIFICATE OF CORRECTION

PATENT NO. : 5,541,686
DATED : July 30, 1996
INVENTOR(S) : Stanley W. Stephenson It is certified that error appears in the above-indentified patent and that said Letters Patent is hereby corrected as shown below:

Column 4, Line 28, delete "theretrough" and insert ---therethrough---

Column 4, Line 67, insert after " pair of sidewalls " ---$W_2$---

Column 4, Line 50, delete "W" and insert---$W_1$---

Signed and Sealed this

Twenty-sixth Day of November 1996

Attest:

BRUCE LEHMAN

Attesting Officer      Commissioner of Patents and Trademarks